Figure 1:
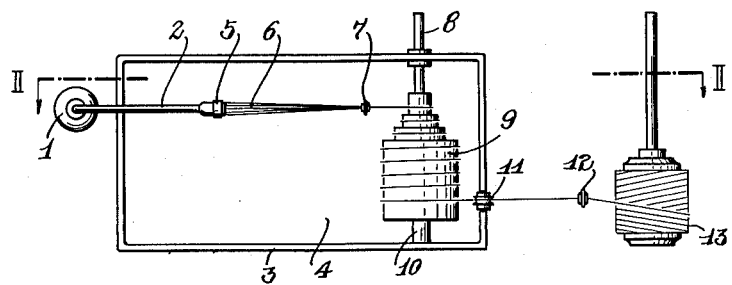

Jan. 24, 1956 SHOZO TACHIKAWA 2,732,279
PROCESS FOR MANUFACTURING OF ARTIFICIAL
FIBER BY VISCOSE METHOD
Filed Dec. 29, 1951

INVENTOR.
SHOZO TACHIKAWA
BY
ATTORNEY

United States Patent Office 2,732,279
Patented Jan. 24, 1956

2,732,279

PROCESS FOR MANUFACTURING OF ARTIFICIAL FIBER BY VISCOSE METHOD

Shozo Tachikawa, Kyoto, Japan

Application December 29, 1951, Serial No. 264,137

2 Claims. (Cl. 18—54)

The present invention relates to a process for the manufacture of artificial fiber, especially of high quality rayon staple. An object of the invention is to produce high quality artificial fiber with properties comparable to those of natural fiber by microspinning a specially prepared viscose with the aid of a special godet provided in the spinning bath.

Abundant investigations have hitherto been conducted to improve the quality of artificial fiber. However, they have never succeeded in producing an artificial fiber having properties comparable to natural fiber. Investigations of artificial fiber of high polymerization degree, starting from the assumption that the deficiency of artificial fiber is due to its low degree of molecular polymerization have been many but have never reached any satisfactory result.

Real improvement in the quality of artificial fiber is possible only when the intrinsic properties of raw fiber are reproduced. This invention provides a process for producing artificial fiber, properties of which are comparable to those of natural fibers. And the essential features of the invention reside in the dissolving procedure for cellulose which permits the retention of a substantial proportion of the intrinsic properties of natural fiber, i. e. molecular polymerization, type of binding between constituents, etc., and in the regenerating procedure which consists of microspinning the dissolved cellulose under controlled conditions to produce an artificial fiber having the intrinsic properties of natural fiber. According to the invention an efficient microspinning can be conducted only for a viscose that has substantially the same properties as natural cellulose.

A description of the present invention is as follows: The degree of molecular polymerization is one of the most basic properties of cellulose fiber. Therefore, in both steeping and shredding procedures, where decrease in polymerization degree is liable to occur, the operation is so effected that the lowering of polymerization degree is avoided as much as possible. Precautions are taken that the temperature does not exceed 20° C. in the shredding and the time for shredding is also limited to less than two hours. The aging of alkali cellulose usually following the shredding is, of course, omitted. The xanthation of alkali cellulose is conducted with a relatively large quantity of carbon bisulfide of more than 45% by weight of cellulose in order to make the cellulose xanthate soluble in the water. The addition of carbon bisulfide is first made at a temperature below 20° C. where the process of xanthation is slow and subsequently, the xanthation is carried out quickly, for instance, in about one hour, at above 25° C. on alkali cellulose, after the carbon bisulfide has been uniformly adsorbed by the alkali cellulose in the lower temperature. Thus a xanthate of high xanthation degree is produced.

In the viscose obtained by dissolving xanthate thus produced in pure water, cellulose is dissolved due to the hydrophilic property of the xanthate radical, while other OH radicals dissolve in a state approaching the OH-union among molecules of natural cellulose. Consequently, it is possible to regenerate artificial fiber having a type of union similar to the OH-union of raw cellulose.

In the conventional processes for dissolving xanthate in alkali, the ionization of OH-radicals in the cellulose molecules is accelerated by the presence of alkali and the OH-union of raw fiber is therefore destroyed. As the result the regenerated cellulose thus obtained includes numerous portions of loose OH-union, which gives a fiber of excessive swelling property.

For the above reasons, the present invention adopts a xanthating process which yields a cellulose xanthate soluble in water as described above. Dissolved in water to obtain viscose, the alkali concentration is limited so as not to exceed 2.5 mol per mol of cellulose. For the reasons described above, the cellulose concentration of viscose is also prevented from substantially exceeding an amount which will just saturate the hydrophilic property of the xanthate radicals present. When excess dissolving water exists, the distance between particles dissolved is increased unnecessarily, which causes the natural properties of the fiber to deteriorate. Obviously a viscose of high polymerization of cellulose has a high viscosity. One of the reasons why the preceding investigations relating to the artificial fiber of high polymerization degree have failed is that, in treating the xanthate, it was first diluted excessively, in disregard of the above considerations, to obtain an easy handling viscose of low viscosity.

In the present invention, therefore, the lower limits of cellulose concentration of viscose are chosen as follows:

TABLE 1

| Polymerization Degree of Regenerated Cellulose (D. P.) | Lower Limit for Cellulose Concentration (Percent) |
|---|---|
| 350–450 | 6.0 |
| 450–550 | 4.3 |
| 550–650 | 3.0 |
| 650–750 | 2.0 |
| Above 750 | 1.5 |

According to the present invention, it is possible by heeding the above considerations to produce a viscose, which is best calculated to retain the intrinsic properties of natural fiber. The viscose is spun without aging, because, if the viscose is aged, the cellulose due to decomposition of xanthate radicals that occurs during aging will become hydrophobic. As a result, the viscose coagulates readily. While the viscose will be easily spinnable after aging, the fiber thus obtained will show low wet-strength and high plasticity, because free OH-radicals formed due to the decomposition of xanthate radicals show at-random-binding in the viscose and constitute a structure entirely different from that of natural fiber.

In case of the viscose which is produced by dissolving a cellulose of high xanthation degree in the water, preferably pure water according to the present invention, the ill effect of aging is particularly noticeable on account of the rapid decomposition of xanthate radicals occurring.

In the present invention, therefore, the aging of viscose is not, as a rule, conducted. But aging if desired should be done as quickly as possible. Then, in the regenerating process of cellulose from viscose, the special spinning process according to the present invention is used. This process and its theoretical basis are explained as follows:

The investigation of the macro-structure of natural fibre has revealed that one filament possesses a long chain molecule as basic structural unit, which is successively growing in the order from molecule, micelle, microfibril, fibril up to fiber, each individual structural unit being all in a shape of fiber, which are the characteristics of the micro-structure of natural fiber.

The objective sought by the process of producing artificial fiber is the reproduction of above microstructure of natural fiber in the product obtained. In the present invention, a spinning process suitable for such an artificial fiber has been discovered after numerous investigations. The said spinning process is named "microspinning" in the present invention.

The first essential condition of the spinning process according to the present invention is to use a spinning bath of low acid and low salt for the production of the viscose. The crystallization of cellulose molecules is accelerated by lowering the acid concentration of the spinning bath. Thus, the fiber obtained simulates natural fiber in the amount of crystallized zone contained. When excess salts are present in the spinning bath, the OH-binding can not be strengthened, because the cellulose xanthate is caused to coagulate prior to the decomposition of xanthate radicals. Though increase of dry strength may be possible due to the improved arrangement of molecules, the wet strength is still low and the swelling property is high in the fibre produced. Therefore, in the spinning bath according to the present invention, the sulfuric acid concentration is kept lower than 30 g./l. and the Glauber's salt concentration below 50 g./l.

The second essential condition of the spinning process is to keep the bath temperature below 30° C. By maintaining a low temperature bath the microstructure above the micelle order of the fiber spun approaches that of natural fiber. When the temperature of the spinning bath is high, the regenerating rate of fiber is accelerated and the fiber obtained does not only show a fibril structure as seen in the natural cellulose, but is also brittle.

The third essential condition of the spinning process is that the spinning velocity is increased consecutively according to the state of regeneration of filaments spun with the use of a stepped godet or a conical godet. In addition, a non-strain fiber is obtained here, as the elongation of filaments are reasonably effected in accordance with the regeneration of cellulose and thus are obtained filaments which show remarkably high bending strength, dyeing property, etc., as compared with fiber obtained by stretching outside of the bath.

Figure 2:
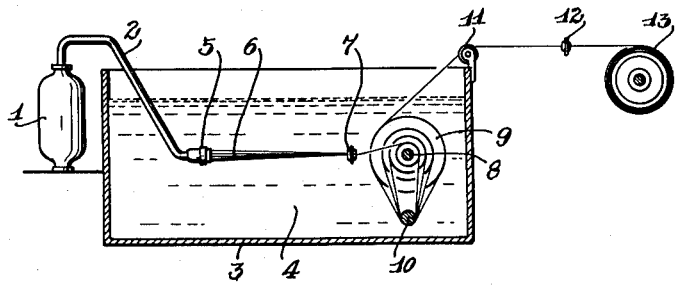
Figure 3:
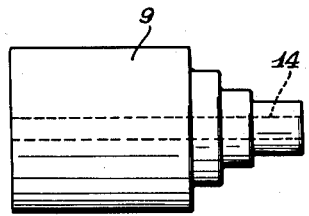
Figure 4:
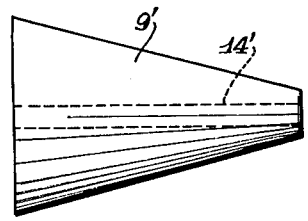

The accompanying drawings show the apparatus, diagrammatically in which the process according to the present invention may be carried out, of which Fig. 1 is a plan view of the apparatus, Fig. 2 a sectional elevation taken on the line II—II of Fig. 1, Fig. 3 side view of a step type godet and Fig. 4 a side view of a conical godet.

Referring to the accompanying drawings the above-mentioned apparatus is explained as follows: The viscose fed by a pump passes through a candle filter 1 and a liquid-viscose-conducting tube (a bend) 2 over to a spinning nozzle 5, adequately arranged in a desired spinning bath 4, previously contained in a spinning tank 3.

Filaments 6, which are ejected through capillary holes of a nozzle 5, travel through a guide 7 and around a smallest diameter or portion of a conical surface, for instance, of a stepped godet 9 or conical godet 9', rotatably provided on a revolving spindle 8 inside of the said bath, and further they proceed around the external peripheries of a guide 10 and the next larger diameter surface portion of the godet and again through the guide 10 and then the third larger diameter portion of the godet, a similar travel being repeated by them until the largest diameter portion of the godet is passed, at a progressively increasing speed. The filament going out of the bath runs over a guide 11 and is given a to and fro motion by a traverse guide 12, so that reeled filaments can always be adjusted uniformly on a spool 13, while it is being reeled thereon.

In the above-mentioned operation, the semi-coagulated filaments ejected from the spinning nozzle 5 are given by the godet a tension corresponding to the progress of coagulation. The result is that the dehydration of the filament and the molecular rearrangement along the fiber axis are smooth and strainlessly effected.

Consequently, it is possible to obtain a non-strain and high strength fiber thereby.

The form of a godet is suitably selected depending upon the kind and the nature of spinning solution used. That is, a diameter of the smallest steps as well as a diametrical ratio between consecutive steps are suitably preselected for a stepped godet, while a suitable cone angle and position for the guides are selected for a conical godet. And the optimum stretching operation is achieved thereby.

Further, central holes 14 or 14' penetrating respectively through a stepped godet 9 or a conical godet 9' is used for accommodating a rotating spindle.

The following example illustrates the way in which the process according to the present invention may be carried out in practice.

*Example*

Wood pulp of polymerization degree of 780 is steeped in 17.5% caustic soda solution at 20° C. for 2 hours, squeezed to 2.75 times the initial weight of the pulp, and shredded at 15° C. for two hours, and then carbon bisulfide of 50% by weight of the pulp is added gradually to it below the temperature of 15° C., where the temperature of alkali cellulose is maintained below 20° C. till 2.5 hours after the addition of carbon bisulfide and thereafter it is raised up to 25° C. for one hour, the reaction being carried out under these conditions. Cellulose xanthate thus obtained is dissolved in pure water to obtain viscose. Viscose obtained in this way has cellulose concentration of 6%, alkali concentration of 2.82% and viscosity of 520 seconds (determined by the falling-ball method). The viscose is subjected directly to the microspinning, without previous aging, on a four-stepped godet (the ratio of consecutive steps is 1:2:2.5:3), immersed in a single sulfuric acid bath of 10.3 g./l. acid concentration, the bath temperature being 25° C.

The comparison between the properties of fiber thus produced and those of ordinary staple fiber is shown in Table 2.

TABLE 2

| | Denier (d.) | Dry Strength (g./d.) | Wet Strength (g./d.) | Dry and Wet Strength ratio (percent) | Swelling rate in the water | Shredding loss in Ball-mill test (percent) | Polymerization degree |
|---|---|---|---|---|---|---|---|
| Artificial fiber by the process of the present invention | 1.53 | 3.33 | 2.51 | 76 | 1.10 | 10.0 | 500 |
| Artificial fiber by ordinary process | 1.51 | 2.74 | 1.56 | 57 | 1.56 | 28.0 | 270 |

The artificial fiber produced according to the process shows excellent features in the strength and other properties as compared with that manufactured in the ordinary process. The fiber obtained by the process, where spinning is effected without using a special godet, which is the third condition of "micro-spinning" process, while tension is given on filament outside a low temperature, low acid and low salt spinning bath, is compared with the fiber produced by the process according to the present invention in Table 3:

TABLE 3

| | Denier (d.) | Dry Strength (g./d.) | Wet Strength (g./d.) | Dry Elongation (Percent) | Wet Elongation (Percent) | Bending Strength (times) | Absorption degree for dye stuff (Percent) | D. P. |
|---|---|---|---|---|---|---|---|---|
| Artificial fiber obtained by the present invention | 1.53 | 3.33 | 2.51 | 9.8 | 14.8 | 310 | 72.8 | 500 |
| Artificial fiber produced without using a godet in the bath | 1.50 | 3.30 | 2.47 | 7.3 | 8.9 | 15 | 12.5 | 500 |

It is apparent that the fiber produced by a process according to the present invention is excellent in the bending strength and dyestuff-absorbing property as compared with others.

I claim:

1. The process of manufacturing artificial fiber by the viscose method comprising spinning into a bath having an acid concentration lower than 30 grams per liter and a salt concentration of lower than 50 grams per liter and a temperature below 30° centigrade, a viscose composed of a cellulose xanthate dissolved in water to a concentration which varies inversely with the degree of polymerization from at least 6% for a degree of polymerization of 350 to at least 1.5% for a degree of polymerization above 750 and an alkali concentration not exceeding 2.5 mols per mol of cellulose, and positively drawing the filaments while immersed within the bath at a controlled speed which increases progressively and continuously with the progress of regeneration of the filaments until the regeneration is complete.

2. The process as defined in claim 1 which includes passing the filaments successively while immersed within the bath over positively driven rotating godet segments of progressively increasing relative diameters and over a guide of uniform diameter.

References Cited in the file of this patent

UNITED STATES PATENTS

| 1,494,841 | Holken | May 10, 1924 |
| 1,689,958 | Moro | Oct. 30, 1928 |
| 1,902,102 | Schmid | Mar. 21, 1933 |
| 1,968,468 | Schur et al. | July 31, 1934 |
| 2,076,596 | Richter | Apr. 13, 1937 |
| 2,106,111 | Bayerl et al. | Jan. 18, 1938 |
| 2,117,038 | Richter | May 10, 1938 |
| 2,155,934 | Eisenhut | Apr. 25, 1939 |
| 2,273,240 | Wesp | Feb. 17, 1942 |
| 2,521,450 | Costa | Sept. 5, 1950 |
| 2,592,355 | Tachikawa | Apr. 8, 1952 |
| 2,607,955 | Drisch | Aug. 26, 1952 |

FOREIGN PATENTS

| 263,233 | Switzerland | Nov. 16, 1949 |
| 501,495 | Great Britain | Feb. 28, 1938 |

OTHER REFERENCES

"Cellulose Chem." (Heuser), published by Wiley & Sons, Inc., New York (page 321 relied upon).